United States Patent [19]
Wagner et al.

[11] Patent Number: 5,657,107
[45] Date of Patent: Aug. 12, 1997

[54] SPRING HINGE FOR EYEWEAR

[75] Inventors: Reiner Wagner, Ispringen; Otto Lehnert, Sinsheim, both of Germany

[73] Assignee: OBE-Werk Ohnmacht & Baumgartner GmbH & Co. KG, Ispringen, Germany

[21] Appl. No.: 98,121

[22] Filed: Jul. 27, 1993

[30] Foreign Application Priority Data

Jul. 27, 1992 [DE] Germany ............................ 9210056 U
Apr. 28, 1993 [DE] Germany ............................ 9306387 U

[51] Int. Cl.⁶ .................... G02C 5/16; G02C 5/22
[52] U.S. Cl. .................... 351/113; 351/153; 16/228
[58] Field of Search .................... 351/113, 111, 351/115, 114, 41, 153; 16/228

[56] References Cited

U.S. PATENT DOCUMENTS 4,991,258  2/1991  Drlik .................................... 351/113
5,018,242  5/1991  Guy et al. ............................. 16/228

Primary Examiner—Hung X. Dang
Attorney, Agent, or Firm—Dvorak and Traub

[57] ABSTRACT

A spring hinge for eyewear which enables the temples of eyeglasses to be opened beyond their regular position of use. The spring hinge having a one or two-piece locking element provided with a sliding element recess engageable with a sliding element and a snap-in pin recess engageable with a snap-in pin. A spring biases the snap-in pin into a stepped recess and thereby automatically locks the spring hinge.

9 Claims, 8 Drawing Sheets

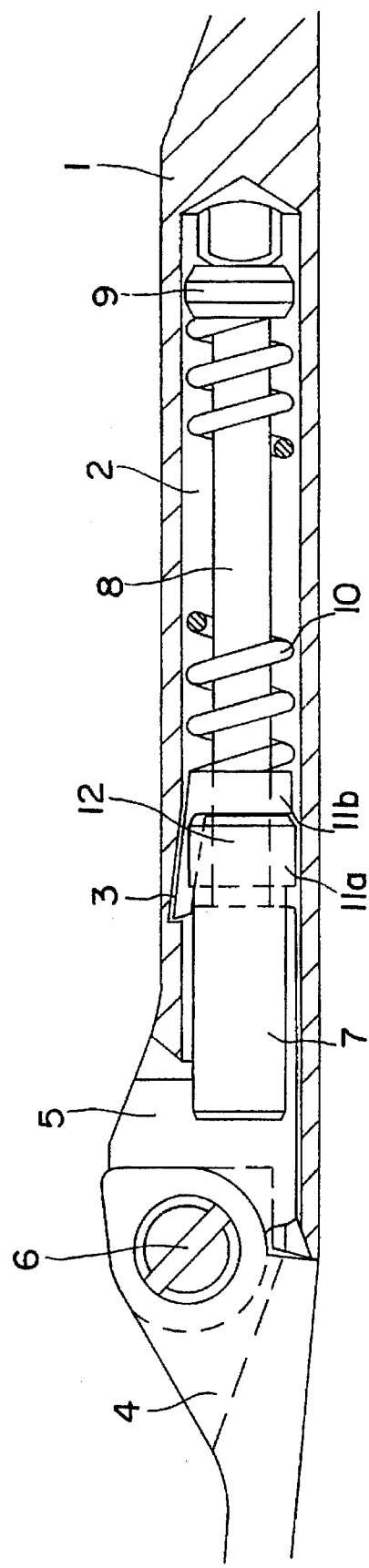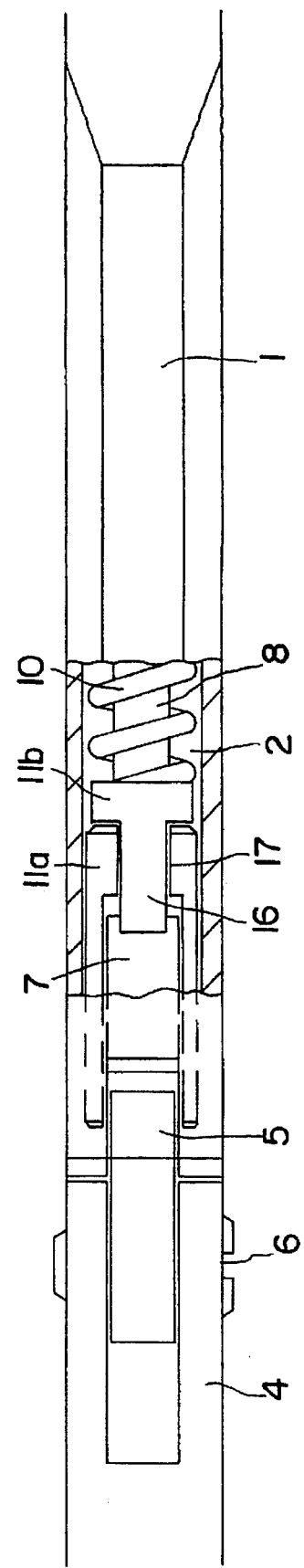

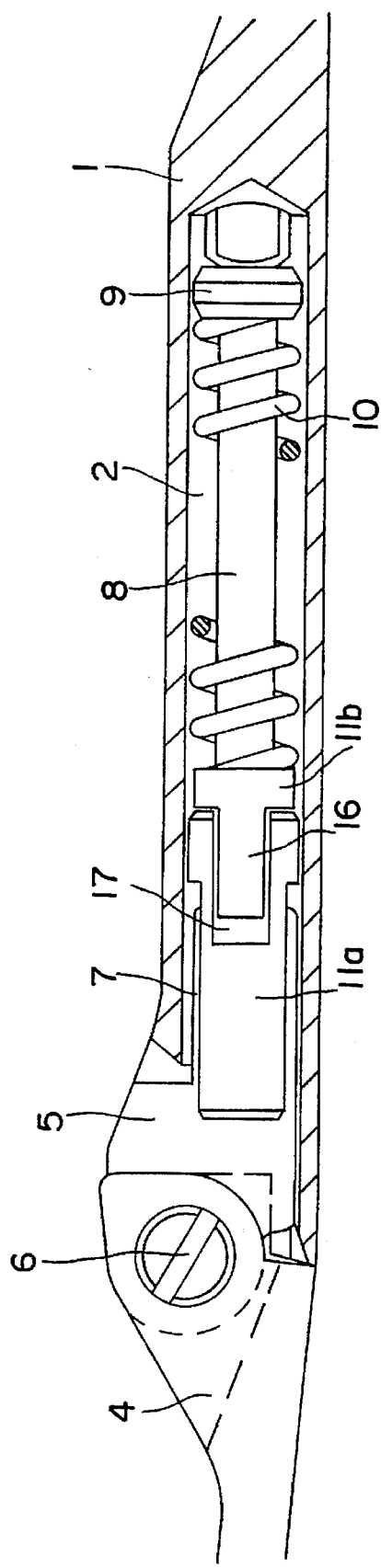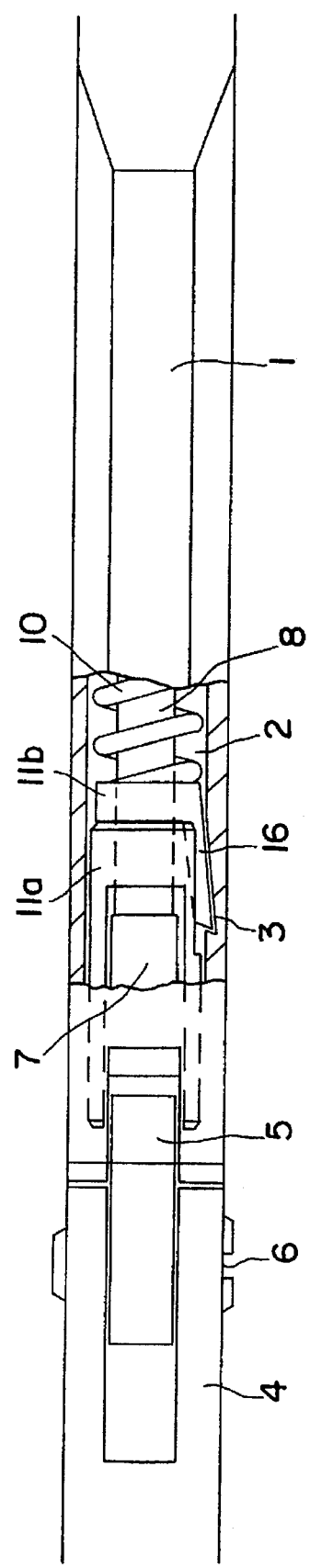

SPRING HINGE FOR EYEWEAR

BACKGROUND OF THE INVENTION

The invention relates to a spring hinge for eyewear enabling the temples of eyeglasses to be opened beyond the regular position of use according to claim 1.

From patent EP 90 107 388 are known spring hinges allowing for the temples of eyewear to be opened beyond the regular position of use and which are intended for use with the temples of eyeglasses. Such a spring hinge is provided with a locking element having a U-shaped cross section. The U-shaped locking element consists of a first and a second leg and presents a projection on the first of its legs on its free side and toward the outside. The locking element is lodged in a sliding element and in a first recess of the sliding element in such a manner that its two legs point away from the axis of the hinge. The projection of the locking element abuts in a spring-loaded manner with the shoulder of a second recess, thus constituting a stop for a spring plunger.

Furthermore, from GB-2 248 121 A is known a spring hinge for eyewear, in which a cylindrical locking element is provided with a circular shoulder. The locking element in GB-2 248 121 is diametrically divided by a slot. The shoulder engages in a recess provided in the temple of the glasses.

A disadvantage of such a design of the spring hinge is that the locking effect of the locking element can be obtained only by a spring resistance acting upon the locking element since the locking element is spread by the spring itself or by a spring plunger. A further disadvantage is that a spring guide pin must preload the required spring to ensure that the locking effect is attained. In turn, this has the disadvantage that the assembly is relatively costly and difficult.

SUMMARY OF THE INVENTION

The present invention is an improvement upon the known hinge whereby an interlocking of the locking element with the frame is automatically attained.

In accordance with the invention, this task is solved according to claim 1. Further advantageous embodiments are the subject of the dependent claims.

The spring hinge according to the invention is characterized by a locking element having at least one snap-in pin which is bent in the direction of the wall of the recess. Because of the biasing of the spring, an automatic locking of the bent snap-in pin occurs in the stepped recess. Therefore, no additional preloading is required, which reduces the assembly costs.

In the case of a locking element designed in one piece, the snap-in pin or the snap-in pins can be produced at the same time as the locking element is prepared or manufactured. Therefore, the manufacture of the snap-in pin together with the locking element does not require any additional components that must be connected to the locking element.

In the case of a locking element having a head from which extends the snap-in pins and in which a sliding element is mounted in a slidable manner between the snap-in pins, the locking element ensures the locking of the spring hinge and the guiding of the sliding element.

Therefore, the locking element has two operational functions. This design of the locking element minimizes the number of elements making up the spring hinge.

If the locking element is designed in such a manner that it presents a recess into which the snap-in pin can be lowered, the dimensions of the locking element or of the recess in the temple of the glasses, respectively(are reduced, since the snap-in pin is lowered into the recess at the time of its assembly, and it snaps into the second recess after having reached it from the recess in the locking element.

The snap-in pin or snap-in pins, respectively, can be produced from a lamina, that is a metal part to be stamped. This design has the advantage that the locking element can be manufactured in a simple manner making it cost-effective. The snap-in pins are then bent away from the lamina at an angle less than 90°.

In order to prevent breaking, it is advantageous that the locking element be made out of a T-shaped blank having a partly cylindrically bent head. This has the advantage that, in the case of spring hinges with a recess in which is mounted a spring guide pin, the spring guide pin extends along the cylindrical part of the locking element obviating the need of manufacturing an opening for the spring guide pin.

The two legs of the T-shaped blank are advantageously designed at a angle to each other. After the blank is bent, one obtains a locking element with a slot for a guide pin. The slot is of such dimensions that the locking element rests with play on the guide pin. The bent locking element presents a tilted plane opposite the longitudinal axis of the spring hinge, so that, because of the effect of a spring resistance, the snap-in pin engages into the recess.

BRIEF DESCRIPTION OF THE DRAWINGS

The Figures describe the further advantages and characteristics of the spring hinge according to the invention and wherein:

FIG. 3 shows a longitudinal view of a second embodiment of a spring hinge;

FIG. 4 shows a top view of the spring hinge according to FIG. 3 with a portion broken away;

FIG. 5 shows a longitudinal view of a third embodiment of an operable spring hinge;

FIG. 6 shows the top view of the spring hinge according to FIG. 5;

DESCRIPTION OF THE PREFERRED EMBODIMENT

Figure 1:
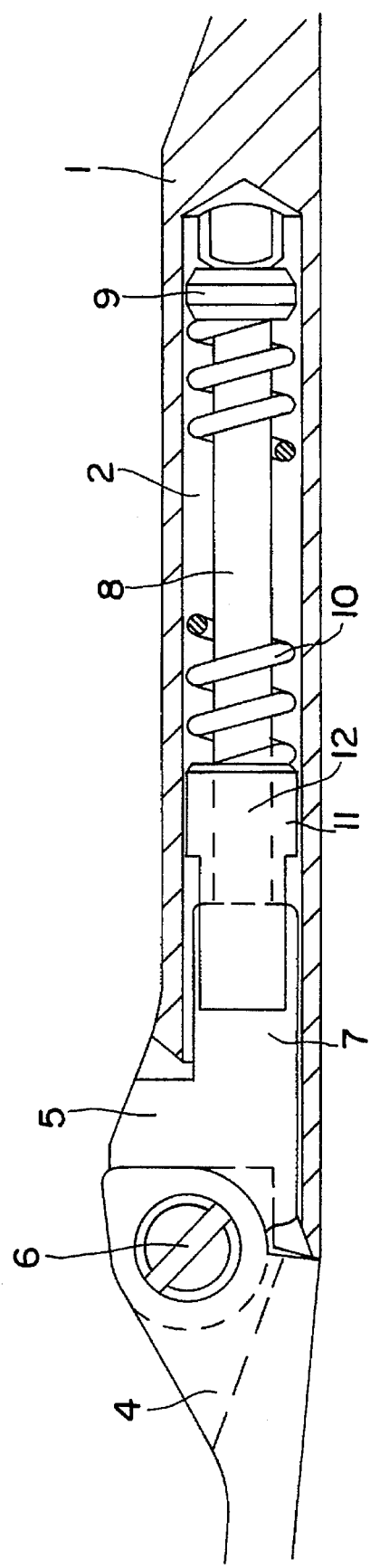
FIG. 1 shows a longitudinal view of an operable spring hinge.

FIGS. 1 to 6 show a spring hinge which enables the temples of eyewear to be opened beyond their regular position of use and intended to be used at the temple of eyeglasses. Closer to a center part of a frame for eyeglasses (not shown) when assembled, the temple has at its front end a first longitudinal recess 2. Concurrent with the longitudinal recess 2 is located, at the end closer to the center part when assembled, a second recess 3 with a stepped rim.

The spring hinge consists of a hinge center piece 4 fastenable to the center part of a frame for eyewear and a temple hinge 5 connectable with the hinge center piece 4 swiveling around a hinge axis 6.

The temple hinge 5 presents a sliding element 7 engageable into the first longitudinal recess 2. The sliding element 7 is connected to a spring guide pin 8. The spring guide pin 8 has a stop 9 at the opposing end from the sliding element 7. The spring guide pin 8 passes through and is encompassed by a spring 10. A locking element 11 is provided between the sliding element 7 and the spring 10. The locking element 11 is provided with a through-hole 12 through which extends the spring guide pin 8.

Figure 2:
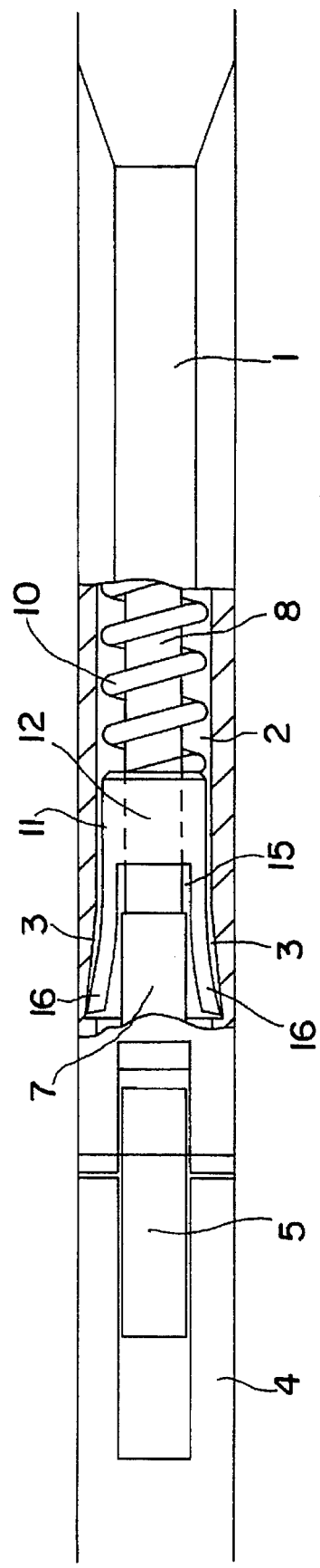
FIG. 2 shows a top view of the spring hinge according to FIG. 1 with a portion broken away.
Figure 11:
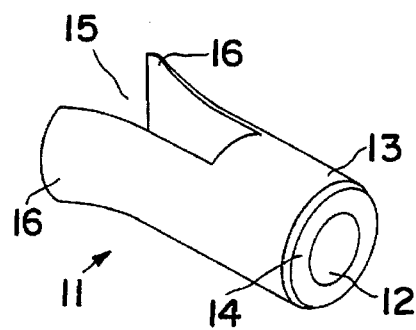
FIG. 11 shows a locking element with two snap-in pins.

FIGS. 1 and 2 show a first embodiment of a locking element 11. FIG. 11 shows the first embodiment of locking element 11 alone.

In one embodiment, the locking element 11 is cylindrically shaped. The use of other geometries is possible and the cross sectional geometry of the locking element 11 is preferably adapted to the cross sectional geometry of the recess 2 or vice-versa.

As can be seen from FIG. 11, the cylindrical locking element 11 presents a head 13 provided with an axial bore hole 12. The guide pin 8 passes through the bore hole 12. The front plane 14 serves as limit stop for the spring 10.

The cylindrical locking element 11 presents a sliding element recess 15 into which the sliding element 7 partially engages. In one embodiment, the sliding element recess 15 is of an essentially rectangular cross section and adapted to the geometry of the sliding element 7 forming two outwardly bent snap-in pins 16 extending in an axial direction from the head 13. These snap-in pins 16 are spring-mounted.

The spring hinge is assembled by placing the locking element 11 and sliding element 7 on the temple hinge 5. Next, the spring guide pin 8 with the spring 10 and the stop 9 is connected to the sliding element 7. In one embodiment, this connection is obtained by a screw means connection. A taphole is provided in the sliding element and the spring guide pin 8 is provided with an outside thread. The temple hinge 5 with its sliding element 7 and the spring guide pin 8 can also be designed in one piece. The thus produced component is subsequently pushed into the spring saddle 1 until the snap-in pins 16 audibly engage into the second recess 3.

The sliding element 7 provided inside the locking element 11 is slidable for a determined distance along the first longitudinal recess 2 against the spring resistance of the spring 10. It is advantageous that the sliding element 7 be moved over the total distance of the locking element 11 from which the sliding element 7 can slide-out. The sliding element 7 shortens the bending point of the snap-in pin 16 thereby obtaining improved reliability.

FIG. 2 illustrates the second recess 3 continuous with the first longitudinal recess 2 in the area of the snap-in pins 16. This is not necessary. The second recess 3 can be channelled around the first longitudinal recess 2. A continuous recess is preferable if the locking element 11 with its snap-in pins 16 can be mounted in the temple of the eyewear regardless of its position. This is the case if, for example, the sliding element 11 has a circular cross section.

Like reference numerals identify like components in the below description of FIGS. 3 to 6.

The spring hinge, as illustrated in FIGS. 3 and 4, differs from the spring hinge according to FIGS. 1 and 2 in the design of the locking element 11 and of the second recess 3.

The second recess 3 is provided only in a certain area of the recess 2.

Figure 9:
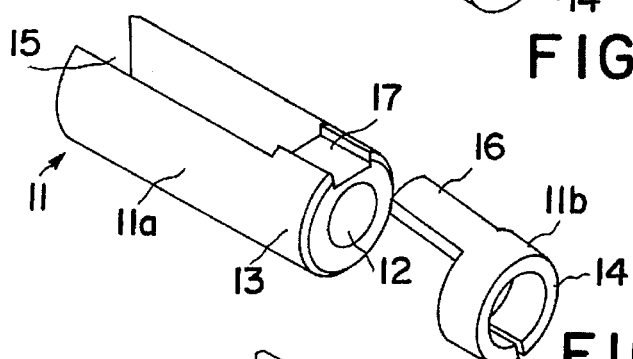
FIG. 9 shows a second embodiment of a two-piece locking element with a snap-in-pin.

FIG. 9 shows a separate illustration of the locking element 11 according to FIG. 3.

The locking element 11 is made up of two parts. It consists of a first part 11a and of a second part 11b. Part 11a is of cylindrical shape and presents a bore hole 12 for the insertion of the spring guide pin 8. Part 11a is provided with a sliding element recess 15 extending in an axial direction. When assembled, the first part 11a guides the sliding element 7. The head 13 of part 11a is provided with a snap-in pin recess 17 extending in an axial direction. The dimensions of the snap-in pin recess 17 essentially correspond to the width and the thickness of the snap-in pin 16.

The snap-in pin recess 17 aids in the positioning of the part 11b and facilitates its assembly. During assembly of the spring hinge, the inside surface of the first longitudinal recess 2 slides atop the snap-in pin 16 thus pressing the snap-in pin 16 into the snap-in pin recess 17. After the snap-in pin 16 reaches the second recess 3, it snaps from the snap-in pin recess 17 into the second recess 3.

Figure 13:
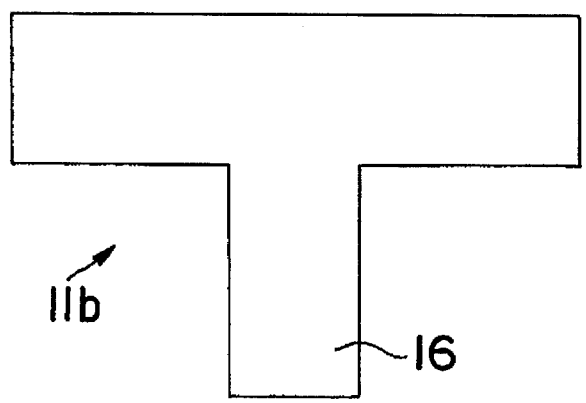
FIG. 13 shows the blank for the snap-in pin according to FIGS. 8.

FIG. 13 illustrates a blank for part 11b. The blank is T-shaped. The head of the T-shaped blank is bent round. The front surface 14 of part 11b serves as support for spring 10.

A shoulder can be provided at the head 13 of part 11a, of which the outside diameter corresponds to the inside diameter of part 11b. Part 11b can then be slipped over part 11a, so that the locking element becomes a one-piece component.

The spring hinge, as illustrated in FIGS. 5 and 6, differs from the presentation of the spring hinge in FIGS. 3 and 4 in the mounting of part 11b on part 11a of the locking element 11.

Figure 8:
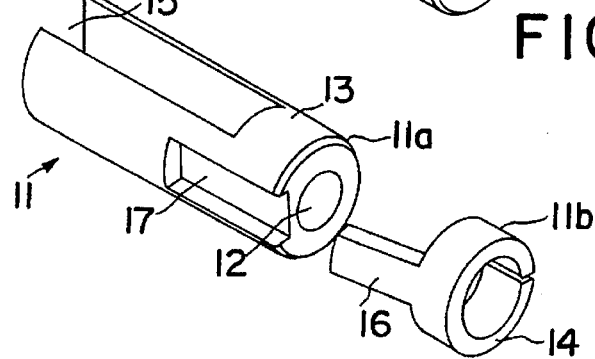
FIG. 8 shows a two-piece locking element with a snap-in pin.

FIG. 8 shows the embodiment of the locking element 11 depicted in FIGS. 5 and 6.

The locking element 11 is made up of two parts and consists of a cylindrical part 11a and a part 11b. Part 11b according to FIG. 8 corresponds to part 11b in FIG. 9.

Part 11a is cylindrical and presents a bore hole 12 for the insertion of the spring guide pin 8. The cylindrical part 11a is provided with a sliding element recess 15 extending in an axial direction for the insertion of the sliding element 7.

The lateral surface of cylindrical part 11a is provided with a snap-in pin recess 17, of which the dimensions with respect to length, width and depth essentially correspond to the dimensions of the snap-in pin 16.

As it can be seen from FIG. 8, the periphery of snap-in pin recess 17 is offset approximately 90° with respect to the sliding element recess 15. This, however, is not necessary. It is decisive that the snap-in pin 16 is installed in such manner that the snap-in pin recess 15 does not extend partially beyond the snap-in pin recess and extends into the sliding element recess. Such an arrangement is particularly advantageous if, as seen from FIG. 5, the transversal extension of sliding element 7 is so large that there is insufficient space to mount the snap-in pin 16.

Figure 7:
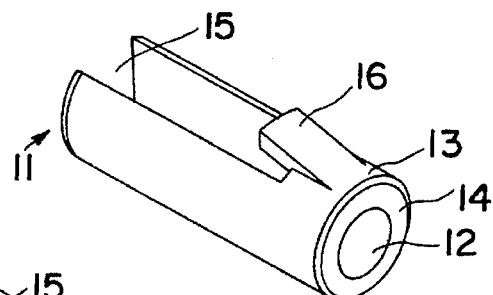
FIG. 7 shows a single-piece locking element with a snap-in pin.

FIG. 7 illustrates one other embodiment of the locking element 11.

FIG. 7 shows a one-piece cylindrically shaped locking element 11. The locking element 11 is provided with a sliding element recess 15 for the insertion of a sliding element 7. Partly overlapping the sliding element recess 15 is provided a snap-in pin 16, that extends from the head 13 to the open end of the sliding element recess 15. The snap-in pin 16 is outwardly bent. The locking element 11 is provided with a bore hole 12 for the insertion of a spring guide pin 8, and with a front surface 14 to support a spring 10.

Figure 10:
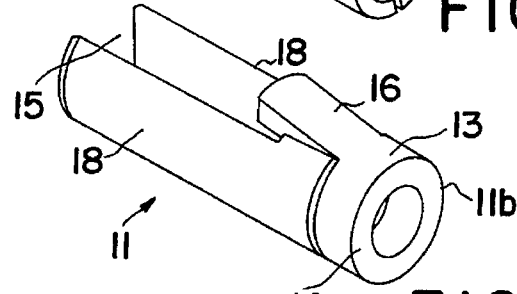
FIG. 10 shows a locking element With a snap-in pin.

FIG. 10 illustrates another embodiment of a locking element 11 with a snap-in pin 16. From the head 13 extend parallel running flaps 18 that are tip-stretched at the head 13.

Figure 12:
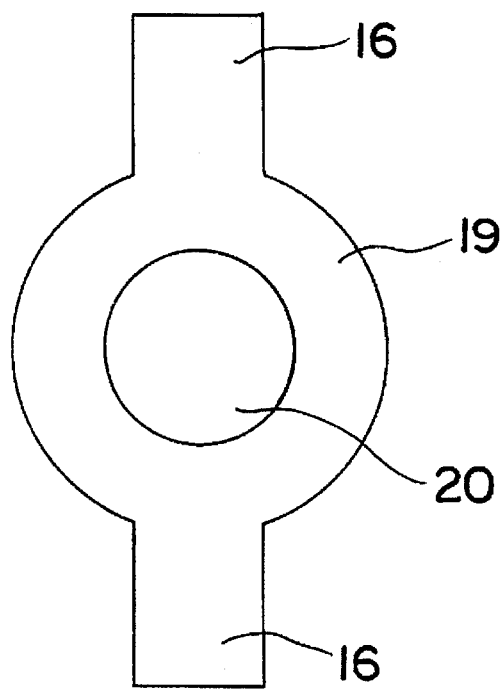
FIG. 12 shows a first embodiment of the blank for a locking element.

The locking element 11 is a turned/milled piece. FIG. 12 illustrates a blank metal piece to be stamped. The blank presents a lamina 19 with an opening 20 through which can pass the spring guide pin 8 after it is assembled. At the periphery of the lamina 19 is provided at least one flap extending in a radial direction which, after bending, serves as a snap-in pin. As shown in FIGS. 8 or 9, the lamina 19 can be stamped to form, for example, part 11a, replacing part 11b.

FIG. 13 shows a blank for part 11b.

It is understood that it is not necessary that the illustrated locking elements be cylindrical. The outside geometry of the locking elements 11 can be adapted to the geometry of the first longitudinal recess 2.

Also, the sliding element recess 15, provided as a guide for sliding element 7, can be of different geometries.

Figure 14:
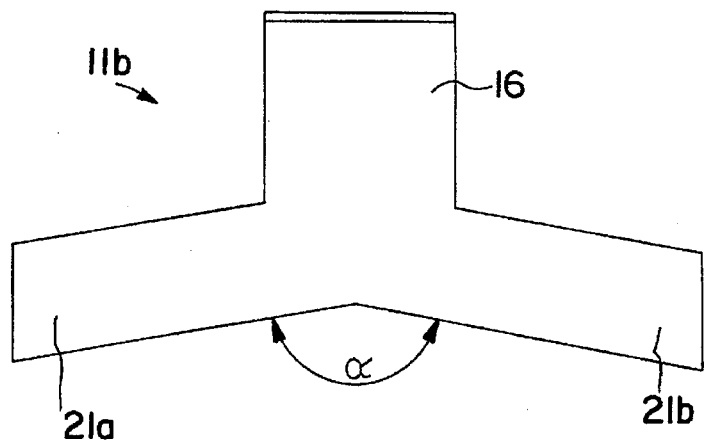
FIG. 14 shows another embodiment of the blank for a locking element.

FIG. 14 shows a second embodiment of a blank for part 11b of the locking element 1. The blank for part 11b of the locking element 11 according to FIG. 14 differs from the blank for part 11b of the locking element a legs 21a, 21b of the T-shaped blank are designed so as to form an angle α to each other.

Figure 15:
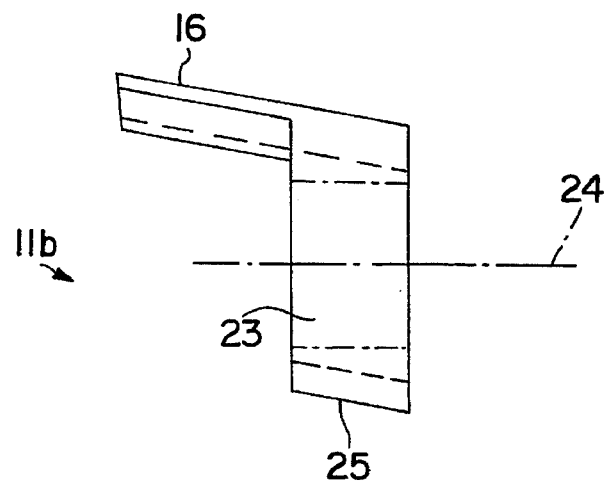
FIG. 15 shows a front view of a locking element according to FIG. 14.
Figure 16:
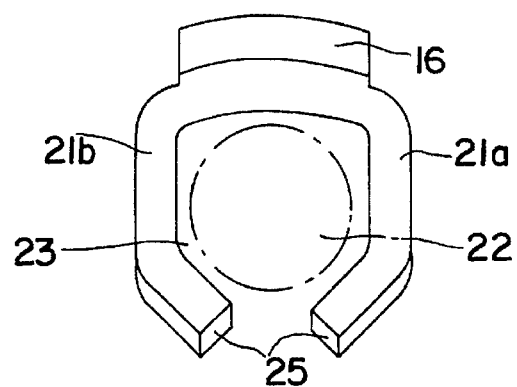
FIG. 16 shows a lateral view from the left of a locking element according to FIG. 14.

After bending the blank, part 11b of the locking element 11 as shown in FIGS. 15 and 16 is obtained. After bending, part 11b of the locking element 11 presents a through-hole 23 through which passes a guide pin 22 in its assembled condition. The through-hole 23 must be dimensioned in such a manner that part 11b of the locking element can rest with play on the guide pin 22. The bent part 11b of the locking element 11 has a tilted plane 25 with respect to the longitudinal axis of a spring hinge. Due to the effect of the spring resistance, the snap-in pin 16 is engageable within the second recess 3. The effect of the spring is to push out the part of the locking element.

Figure 20:
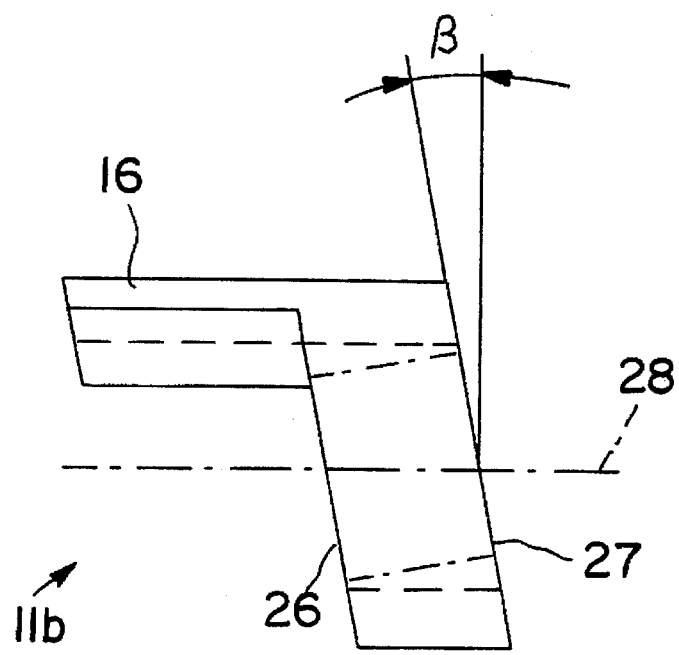
FIG. 20 shows a front view of another embodiment of a locking element.
Figure 21:
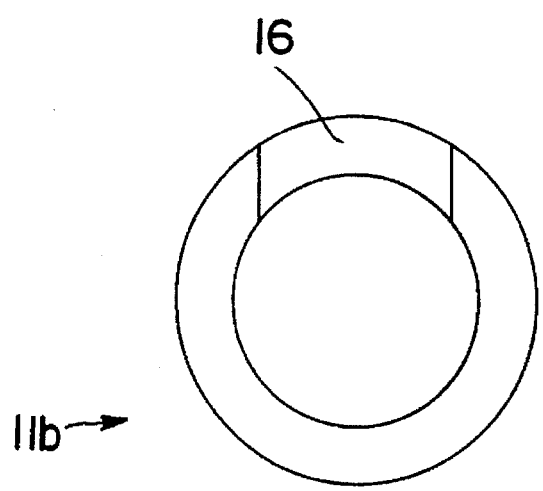
FIG. 21 shows a lateral view from the left of a locking element according to FIG. 20.

The locking element according to FIGS. 20 and 21 differs from the locking element according to FIG. 14 in that the locking element is made out of a tube. The manufacturing process is through metal cutting. The locking element presents two essentially parallel planes 26, 27 facing each other. The planes are tilted at an angle β with respect to the axis of the hollow section, so that because of the spring resistance action the snap-in pin 16 can engage in recess 3.

Figure 17:
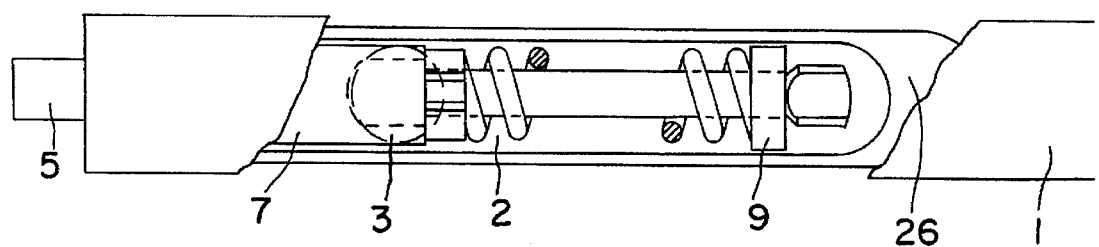
FIG. 17 shows a top view of a spring hinge with a locking element according to FIG. 15.
Figure 18:
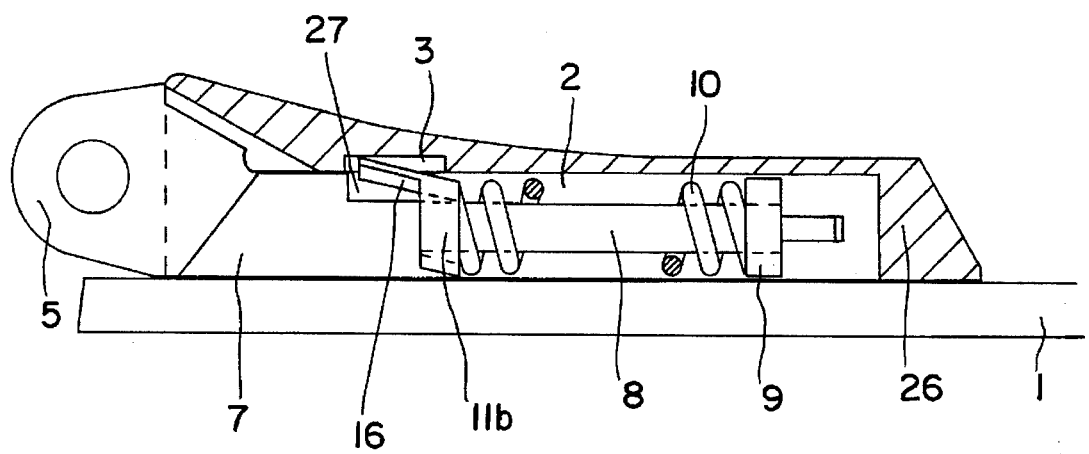
FIG. 18 shows a front view section of the spring hinge according to FIG. 17.
Figure 19:
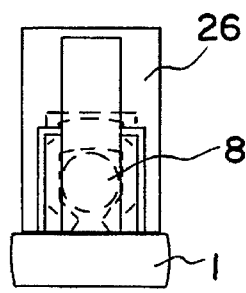
FIG. 19 shows the view from the left of the spring hinge according to FIG. 18.

FIG. 17 illustrates an assembled spring hinge with a locking element part 11b according to FIG. 14.

The spring hinge is provided with an oblong guide housing 26 that is mounted on a temple of eyeglasses 1. The housing 26 is provided with an oblong recess 2 in which is located a second recess 3 with a stepped rim and, when assembled, closer to the end of the center part. Into the recess 2 engages a sliding element 7 that is connected with a spring guide pin 8. The spring guide pin 8 is provided with a stop 9 at the end opposite the sliding element 7. The spring guide pin 8 passes through the spring 10. Between the sliding element 7 and the spring 10 is mounted the locking element part 11b. The locking element part 11b is provided with a snap-in pin 16 that engages with the second recess 3.

In the embodiment according to FIG. 17, the snap-in pin 16 of the locking element part 11b engages with the second recess 3. This is attained by the spring action of spring 10 lifting the locking element part 11b. One end of the spring 10 abuts against part 11 of the locking element.

The sliding element 7 is provided with a recess 27 in which the snap-in pin 16 rests when the spring is not under tension.

We claim:

1. A spring hinge for eyewear enabling opening of a temple of eyeglasses beyond a regular position of use and used at a front end of the temple of eyeglasses when assembled closer to a center part of a frame for eyeglasses, a first oblong recess in which is located a second recess with a stepped rim at an end closer to the center part of the frame for eyeglasses when assembled, a center part hinge mounted at the center part, and a temple hinge connected by a hinged means with the center part hinge around a hinge axis, and a locking element guided by a sliding element provided at the temple hinge mountable in the first recess and extendable over a given distance against a spring resistance and engageable and lockable into a second recess comprising at least with one snap-in pin from the locking in a direction of a wall of the second recess.

2. The spring hinge according to claim 1, wherein the locking element and the snap-in pin are designed further comprise a one-piece component.

3. The spring hinge according to claim 2, wherein the locking element further comprises a head from which extends the snap-in pin wherein the sliding element is displaceably mounted between the snap-in pins.

4. The spring hinge according to claim 1, further comprising a locking element having a recess corresponding to a dimension of the snap-in pin.

5. The spring hinge according to claim 1, wherein the snap-in pin is formed from a lamina.

6. The spring hinge according to claim 5, wherein the lamina is made from a stamped metal.

7. The spring hinge according to claim 1 wherein the locking element is made from a T-shaped blank having a top part that is partly cylindrically bent.

8. The spring hinge according to claim 7, wherein the T-shaped blank further comprises a first and a second leg formed at an angle a to each a through-hole having an inside diameter larger than the cross section of a spring guide pin.

9. The spring hinge according to claim 1 wherein the locking element is manufactured from a hollow section and provided with a first and a second essentially parallel plane, each of said planes facing each other and at an angle with respect to an axis of the hollow section.

* * * * *